United States Patent
Bandyopadhyay et al.

(10) Patent No.: US 9,626,138 B2
(45) Date of Patent: Apr. 18, 2017

(54) RECONSTRUCTION OF SUSPENDED PRINT JOBS

(71) Applicants: Aritra Bandyopadhyay, Boulder, CO (US); David Ward, Broomfield, CO (US); Katie Ashley Eng, Boulder, CO (US)

(72) Inventors: Aritra Bandyopadhyay, Boulder, CO (US); David Ward, Broomfield, CO (US); Katie Ashley Eng, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/518,080

(22) Filed: Oct. 20, 2014

(65) Prior Publication Data
US 2016/0110144 A1    Apr. 21, 2016

(51) Int. Cl.
*G06F 3/12* (2006.01)
*G03G 15/00* (2006.01)

(52) U.S. Cl.
CPC .......... *G06F 3/1252* (2013.01); *G03G 15/655* (2013.01); *G06F 3/1234* (2013.01); *G06F 3/1241* (2013.01); *G06F 3/1242* (2013.01); *G06F 3/1293* (2013.01)

(58) Field of Classification Search
CPC .................................................. G03G 15/655
See application file for complete search history.

(56) References Cited

U.S. PATENT DOCUMENTS

| 5,684,934 | A | 11/1997 | Chen et al. |
| 6,631,007 | B1 | 10/2003 | Buis et al. |
| 6,965,440 | B1 * | 11/2005 | Nakagiri ................ 358/1.12 |
| 7,843,582 | B2 | 11/2010 | Burlingame |
| 7,864,350 | B2 | 1/2011 | Endo et al. |
| 8,305,615 | B2 | 11/2012 | Kanno |
| 8,730,507 | B2 | 5/2014 | Muramatsu |
| 8,744,335 | B2 * | 6/2014 | Matsumoto et al. ...... 399/401 |
| 2002/0054310 | A1 * | 5/2002 | Nakagiri ............ G06F 3/1297 358/1.12 |
| 2003/0161000 | A1 * | 8/2003 | Suzuki ................. 358/1.15 |
| 2004/0114184 | A1 * | 6/2004 | Sugiyama ............. 358/1.18 |

(Continued)

FOREIGN PATENT DOCUMENTS

JP        2012192672      10/2010

*Primary Examiner* — Nicholas Pachol
(74) *Attorney, Agent, or Firm* — Duft Bornsen & Fettig LLP (57) ABSTRACT

System and methods for reconstructing a suspended print job. In one embodiment, a print controller receives a print job, and initiates construction of a sheet based on logical pages of the print job. Print controller determines a sheet number for the sheet that identifies a page number of one or more logical pages related to the construction of the sheet, an offset for the sheet that identifies an order of the sheet with respect to other sheets that share the sheet number. Print controller also assigns a sheet identifier to the sheet that includes the sheet number and the offset, and receives the sheet identifier in response to a determination to resume the print job from a suspended state. Print controller initiates processing for resuming the print job from the sheet based on the sheet number and the offset in the sheet identifier.

20 Claims, 5 Drawing Sheets

(56) References Cited

U.S. PATENT DOCUMENTS

| | | | |
|---|---|---|---|
| 2007/0070442 A1* | 3/2007 | Ohkubo | H04N 1/00442 358/451 |
| 2007/0127064 A1* | 6/2007 | Kuroshima | G06F 3/1204 358/1.15 |
| 2007/0236723 A1* | 10/2007 | Gaertner et al. | 358/1.15 |
| 2007/0248373 A1* | 10/2007 | Vekaria | 399/82 |
| 2008/0106755 A1* | 5/2008 | Morooka | G06F 3/1204 358/1.15 |
| 2008/0158587 A1* | 7/2008 | Owari | 358/1.14 |
| 2010/0033761 A1* | 2/2010 | Nakagiri et al. | 358/1.15 |
| 2011/0069337 A1* | 3/2011 | Sugiyama | 358/1.13 |
| 2011/0116122 A1* | 5/2011 | Jessen et al. | 358/1.15 |
| 2011/0205592 A1* | 8/2011 | Nakagiri et al. | 358/1.15 |
| 2011/0242564 A1* | 10/2011 | Armstrong et al. | 358/1.13 |
| 2011/0242565 A1* | 10/2011 | Armstrong | 358/1.13 |
| 2011/0242582 A1* | 10/2011 | Armstrong et al. | 358/1.15 |
| 2012/0127499 A1* | 5/2012 | Takashima | B42C 19/02 358/1.13 |
| 2012/0243033 A1* | 9/2012 | Hayakawa | G06K 15/1851 358/1.15 |
| 2013/0050761 A1* | 2/2013 | Nakagiri et al. | 358/1.15 |
| 2013/0061134 A1* | 3/2013 | Maehira | 715/251 |
| 2013/0258377 A1* | 10/2013 | Armstrong et al. | 358/1.13 |
| 2014/0022596 A1* | 1/2014 | Nakagiri et al. | 358/1.15 |
| 2014/0023415 A1* | 1/2014 | Takane | 399/367 |
| 2014/0140789 A1* | 5/2014 | Nonaka | 412/6 |
| 2014/0146351 A1* | 5/2014 | Tanaka et al. | 358/1.15 |
| 2014/0146353 A1* | 5/2014 | Tanaka et al. | 358/1.15 |
| 2014/0146354 A1* | 5/2014 | Tanaka et al. | 358/1.15 |
| 2014/0168706 A1* | 6/2014 | Nakagiri et al. | 358/1.15 |
| 2015/0160901 A1* | 6/2015 | Hashimoto | G06F 3/1241 358/1.15 |

\* cited by examiner

| TYPE OF SHEET | SHEET NUMBER | OFFSET |
|---|---|---|
| DATA SHEET | THE FIRST PAGE IN THE DATA SHEET | 0 |
| BANNER PAGE OR COVER PAGES BEFORE JOBS | 0 | THE POSITION OF THE SHEET AMONG SHEETS THAT SHARE A SHEET NUMBER |
| INSERT SHEETS BEFORE PAGES | THE FIRST PAGE IN THE SHEET THAT OWNS THE INSERT | A NEGATIVE INTEGER OF THE POSITION OF SHEETS BEFORE A SHARED SHEET NUMBER |
| INSERT SHEETS AFTER PAGES | THE FIRST PAGE IN THE SHEET THAT OWNS THE INSERT | A POSITIVE INTEGER OF THE POSITION OF SHEETS AFTER A SHARED SHEET NUMBER |
| BANNER PAGE OR COVER PAGES AFTER JOBS | TOTAL NUMBER OF PAGES + 1 | THE POSITION OF THE SHEET AMONG SHEETS THAT SHARE A SHEET NUMBER |

RECONSTRUCTION OF SUSPENDED PRINT JOBS

FIELD OF THE INVENTION

The invention relates to the field of printing systems, and in particular, to reconstruction of suspended print jobs.

BACKGROUND

Printers generally include a print controller that receives and prepares print data for a print engine. The print data typically describes logical pages which the print controller assembles onto sheets. For example, in 2-up printing, two logical pages are placed on a side (e.g., a sheet includes four pages with two pages on each side). The relationship between the logical pages and the sheets is captured in the job model for the print job.

When the print job is dispatched to the print engine, information of the job model is lost. Each sheet to be printed has an associated sheet identifier that the print engine uses for determining the order of sheets in the print job. However, there is no context at the print engine as to how the logical pages and sheets are related in the print job.

Therefore, upon suspension of a print job, a print engine controller sends the sheet identifier of the suspended sheet to the print controller for reconstruction of the print job. The print controller then rebuilds the job model from the beginning. To resume the suspended print job, those sheets having a sheet identifier larger than the sheet identifier of the suspended sheet are re-dispatched to the print engine. Prior to that, however, the print controller has to re-map the relationship of the logical pages and the sheets for the entire print job. The re-processing of the entire print job each time a job is suspended and resumed is inefficient.

SUMMARY

Embodiments described herein provide for reconstructing a suspended print job. Before a print job is dispatched to the print engine, the sheet identifiers are modified to include job model information. When a print job is suspended, the sheet identifier of the suspended sheet includes information for how that sheet is related to logical pages within the print job. The print controller is therefore able to reconstruct the suspended job from the suspended sheet rather than from the beginning of the print job. For example, a simplex, 1-up, 1,000 page print job that is suspended at sheet 900 is able to re-map logical pages and sheets from page 900 (i.e., process pages 900-1,000) instead of re-mapping pages 1-1,000, improving print job reconstruction efficiency.

One embodiment is a system that includes a print controller configured to receive a print job, and to initiate construction of a sheet based on logical pages of the print job. The print controller is also configured to determine a sheet number for the sheet that identifies a page number of one or more logical pages related to the construction of the sheet, and to determine an offset for the sheet that identifies an order of the sheet with respect to other sheets that share the sheet number. The print controller is also configured to assign a sheet identifier to the sheet that includes the sheet number and the offset, and to receive the sheet identifier in response to a determination to resume the print job from a suspended state. The print controller is also configured to initiate processing for resuming the print job from the sheet based on the sheet number and the offset in the sheet identifier.

The above summary provides a basic understanding of some aspects of the specification. This summary is not an extensive overview of the specification. It is not intended to identify key or critical elements of the specification nor to delineate any scope of particular embodiments of the specification, or any scope of the claims. Its sole purpose is to present some concepts of the specification in a simplified form as a prelude to the more detailed description that is presented later. Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
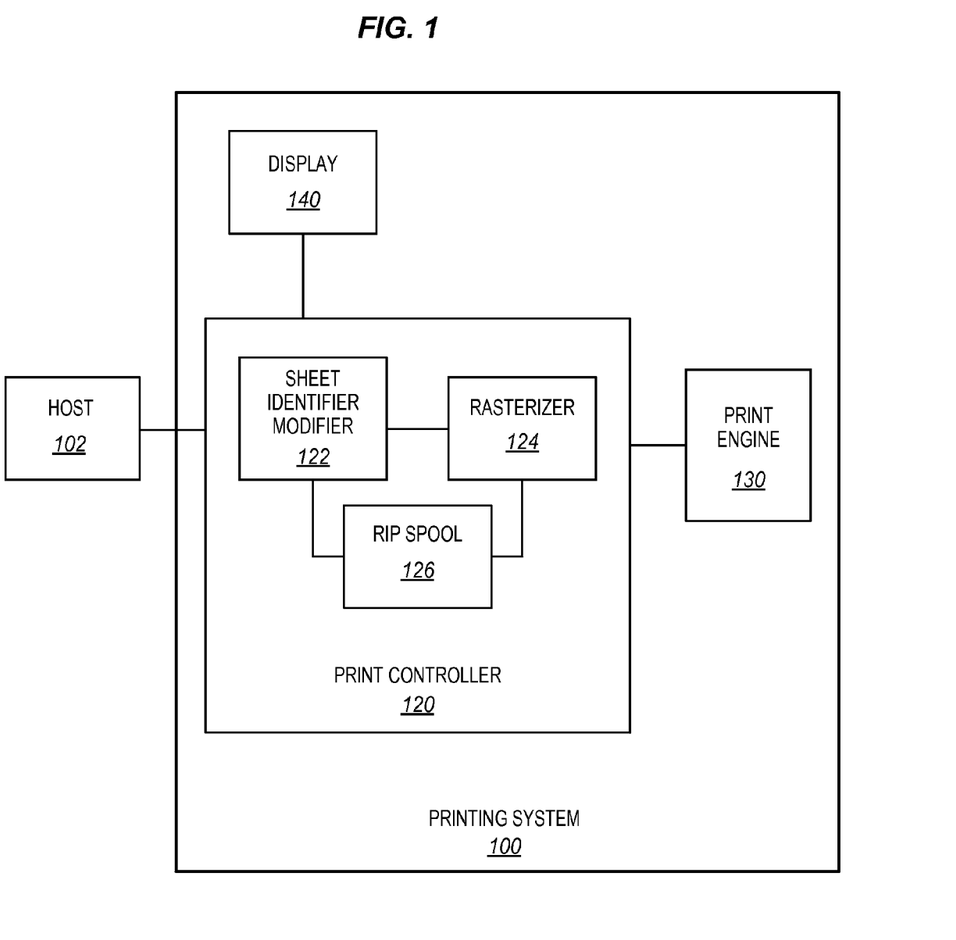
FIG. 1 is a block diagram of a printing system in an exemplary embodiment.

FIG. 1 is a block diagram of a printing system 100 in an exemplary embodiment. Printing system 100 includes print controller 120 that is coupled with host 102, print engine 130, and display 140. Print controller 120 receives incoming print jobs from host 102, and transmits rasterized data for the print job to print engine 130 or display 140. The print job includes raw print data in a page description format such as PDL, Mixed Object: Document Content Architecture (MO:DCA) based on the Advanced Function Presentation (AFP) environment, Printer Control Language (PCL), PostScript data, etc. The print job may also include a job ticket that defines various characteristics of the print job, such as the type of media to use when printing the job (e.g., size, weight, color, etc.), the number of logical pages per sheet side, etc.

Print controller 120 may perform a number of data processing operations on the print data prior to the media marking step, such as rasterizing bitmaps of the logical pages of the print data with rasterizer 124, spooling the bitmap data and/or sheet side images to a rip spool 126, etc. Rip spool 126 is used to store bitmap data for a print job to be printed at some later time. The rasterized image ("dots on a sheet") may be assembled with other rasterized images to create the sheetside image that is marked upon physical sheets by print engine 130. Print controller 120 thus assembles sheet side images of the logical pages and dispatches the sheets to print engine 130. Print engine 130 may comprise any combination of printing machinery operable to mark the sheetside images onto printable media.

In prior print systems, relationship information between sheets and pages is lost when the sheets are constructed and dispatched to the print engine. When a job is suspended and resumed, the print engine recognizes the sheet the suspension occurred at, but has no information as to which source page(s) are to be included on the sheet. Because the number of the suspended sheet has no explicit relationship with source pages, the printer is forced to build the job model from the beginning of the job (and re-establish the relationship between the sheets and the pages over again) in order to resume the print job from the correct point. Assembling sheetside images for a print job from the beginning at each resumption degrades performance and increases the memory footprint.

Print controller 120 is therefore enhanced with sheet identifier modifier 122 that is configured to establish relationships of sheets and pages for print jobs. For example, a print job may include a sheet that contains multiple pages (e.g., 4-up print job) and/or special sheets such as inserts that are associated with specific pages. Sheet identifier modifier 122 modifies sheet identifiers so that the sheet identifiers establish how the source pages of the job relate with a given sheet. As a result, during resumption of a suspended job, when a controller associated with the printer reports the identifier of the suspended sheet, the sheet is identified within the context of the entire job and the job model is constructed more efficiently with less memory usage for storing the job model.

Figure 2:
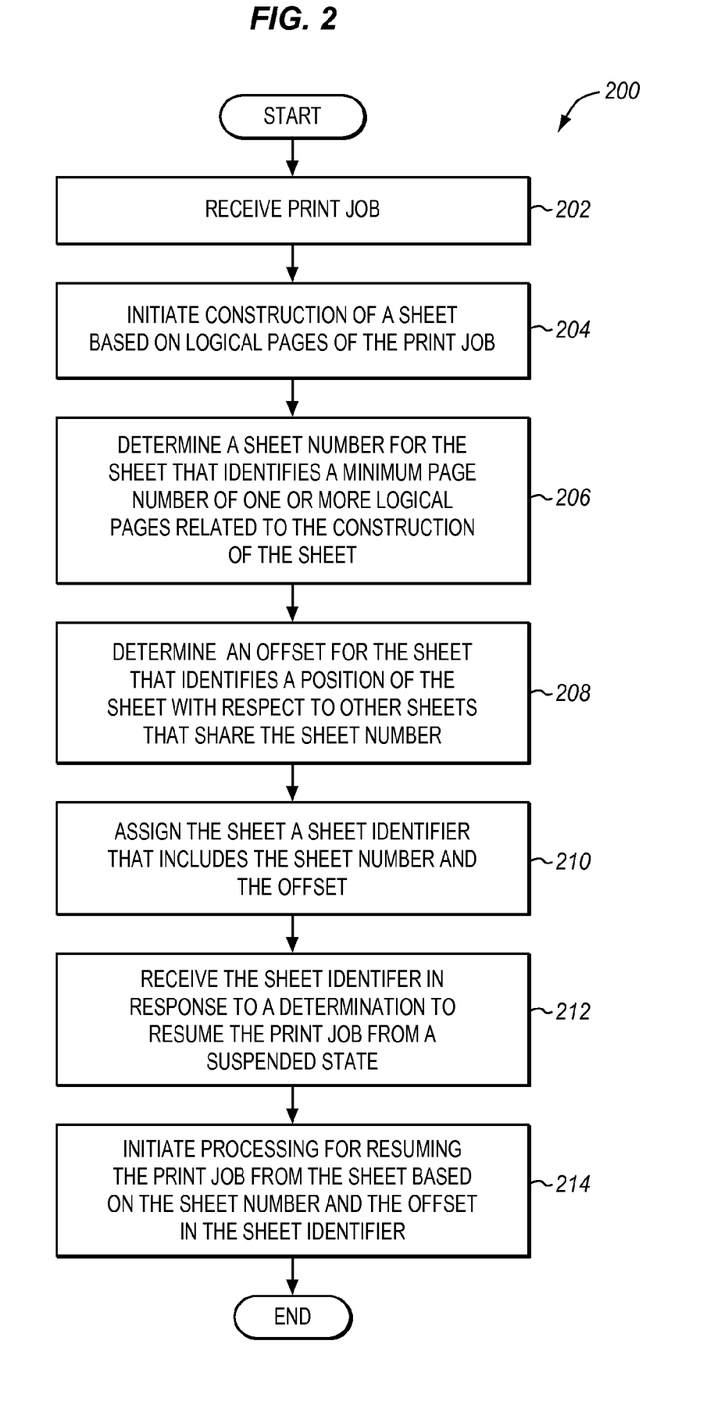
FIG. 2 is a flow chart illustrating a method for reconstructing a suspended job in an exemplary embodiment.

FIG. 2 is a flow chart illustrating a method 200 for reconstructing a suspended job in an exemplary embodiment. The steps of the method 200 will be described with respect to printing system 100 of FIG. 1, although one skilled in the art will understand that method 200 may be performed by other systems not shown. The steps of the method 200 described herein are not all inclusive and may include other steps not shown. The steps for the flow charts shown herein may also be performed in an alternative order.

At step 202, print controller 120 receives print data from host 102. The print data may be encoded according to a page description language (e.g., PostScript), and may include a print job and an associated job ticket. The logical pages of the print job may be segmented into individual logical pages at the time the print data is received, or print controller 120 may segment the incoming print data into logical pages after receiving the print data.

At step 204, print controller 120 initiates construction of a sheet based on logical pages of the print job. As described above, a print job may include a sheet with multiple logical pages (e.g., 4-up print job). Also, a print job may include special sheets such as inserts that are associated with specific logical pages. For example, a user may stipulate that an insert sheet is to be added before or after a specified logical page in the print job. Other types of sheets include banner pages (e.g., to be added at the beginning or end of a print job).

At step 206, sheet identifier modifier 122 determines a sheet number for the sheet that identifies a page number of one or more logical pages related to the construction of the sheet. In one embodiment, sheet identifier modifier 122 determines the sheet number for the sheet that identifies a minimum page number of one or more logical pages related to the construction of the sheet. As discussed in more detail below, sheet numbers may be determined/assigned based on other criteria or rules (e.g., if the sheet is a non-data sheet such as an insert sheet or banner page).

At step 208, sheet identifier modifier 122 determines an offset for the sheet that identifies an order of the sheet with respect to other sheets that share the sheet number. For example, the offset may be set to zero (or some other identifier) if the sheet is a data sheet that includes a logical page. Or, the offset may be set to a negative or positive integer based on whether, for example, an insert sheet is indicated to be attached before or after a logical page that belongs in another sheet.

At step 210, sheet identifier modifier 122 assigns the sheet a sheet identifier that includes the sheet number and the sheet offset. Thereafter, the sheet (and its assigned sheet identifier) may be dispatched to print engine 130 for printing. At a subsequent point in time, the print job that includes the sheet may be suspended for a variety of reasons (e.g., by operator, errors in printing or post-printing, etc.). A controller associated with print engine 130 may be configured to supply the sheet identifier that is associated with the suspended sheet in the print job.

At step 212, print controller 120 receives (or retrieves) the sheet identifier in response to a determination to resume the print job from a suspended state. For example, a suspended print job may resume in response to operator input, automatic error detection sequences, etc. At step 214, print controller 214 initiates processing for resuming the print job from the sheet based on the sheet number and the offset in the sheet identifier. Using method 200, there is no need for creating a job model from the beginning to correctly determine the context of a suspended sheet. Because the sheet number and the offset are calculated for each sheet in the job, the sheet identifiers created using method 200 improve processing efficiency for resuming a suspended print job because an immediate reference is made to the suspended sheet to in the context of the print job without any operator input.

For example, previously, in order resume a 1,000 page print job that is suspended at page 900, a controller would rebuild the relationship information between logical pages and sheets for pages 1-1,000 even though only pages 901-1,000 are to be printed. That is, a page processor builds the job model and produces the sheets from beginning (i.e., page 1) in order to resume a suspended job. In this previous scheme, though sheets are produced from the beginning, only those sheets that have an identifier that is larger than the identifier of the suspended sheet are dispatched to the printer for printing so that the suspended job is able to resume.

In method 200, print controller 120 derives the relevant suspended page from the modified sheet identifier (e.g., sheet number and offset described above) associated with the suspended sheet. Thus, in the example above, print controller 120 is able to initiate processing (e.g., develop mapping structure between logical pages and sheets for the print job) from the suspended page (e.g., page 900) instead of page 1. In other words, with enhanced features of sheet identifier modifier 122, processing is reduced to pages 900-1,000 with processing of prior pages being skipped.

In one embodiment, the sheet number represents the last source page in a submitted job that is used to assemble the current sheet. Thus, for any printable sheet containing a logical page to be printed, the sheet number is the first source page added to the sheet, or, put another way, the minimum page number of the logical pages related to the construction of the sheet. For sheets with no page data, such as inserts or banner pages, the sheet number may be assigned based on other criteria or rules. For example, a banner page before a print job may be assigned a non-existent number (e.g., no logical pages within the print job have that number) such as 0, and a banner page after the print job may assigned a non-existent number that is one unit larger than the last page of the logical page of the print job. As described in more detail in the example below, some sheets may share a sheet number. For sheets sharing the same sheet number, the offset represents an order, or index, of the sheet among the sheets that share a sheet number.

Figure 3:
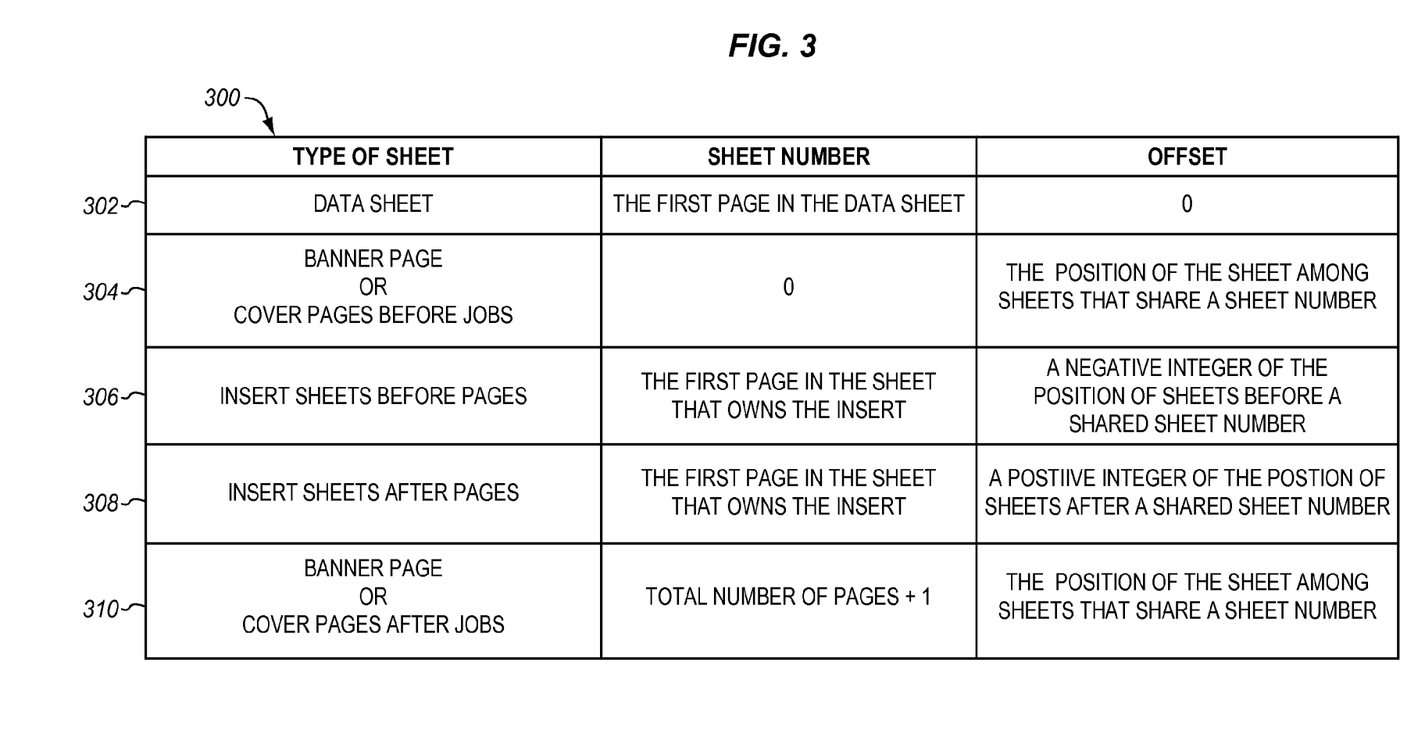
FIG. 3 illustrates a table of rules for creating sheet identifiers in an exemplary embodiment.

FIG. 3 is a table of rules for creating sheet identifiers in an exemplary embodiment. In rule 302, for a data sheet (e.g., a sheet that includes one or more logical pages to be printed thereon), sheet identifier modifier 122 sets the sheet number to the first page (i.e., the page number of the first logical page included in the sheet) in the data sheet, and sets the offset to 0. In rule 304, for a banner page before a job (or a cover page), sheet identifier modifier 122 sets the sheet number to 0 and the offset to the order of the sheet among sheets that share a sheet number.

In rule 306, for insert sheets to be attached before pages, sheet identifier modifier 122 sets the sheet number to the first page in the sheet that owns the insert, and sets the offset to a negative integer of the order of sheets before a shared sheet number. In rule 308, for insert sheets to be attached after pages, sheet identifier modifier 122 sets the sheet number to the first page in the sheet that owns the insert, and sets the offset to a positive integer of the order of sheets before a sheet number. In rule 310, for a banner page after a job (or a cover page), the sheet identifier modifier 122 sets the sheet number to the total number of pages in the job plus 1, and sets the offset to the order of the sheet among sheets that share a sheet number.

Print controller 120 is configured to reconstruct/dispatch certain sheets for the print job in response to a determination to resume a suspended print job. In this regard, print controller 120 may employ logic for determining whether a sheet is to be reconstructed and/or whether a reconstructed sheet is to be dispatched to the print engine for printing. In one embodiment, the print controller 120 is configured to initiate reconstruction of sheets (e.g., re-perform one or more of steps 204-210 described above) in the print job based on logical pages in the print job that have page numbers that are greater to or equal to the sheet identifier (e.g., sheet identifier of the suspended sheet received in step 212). In another embodiment, among the sheets that have been reconstructed, the print controller 120 may include logic to dispatch reconstructed sheets that have a sheet number greater than the sheet number of the suspended sheet. The logic may further indicate to dispatch a reconstructed sheet if the reconstructed sheet number is equal to the sheet number of the suspended sheet and the offset of the reconstructed sheet is greater than the offset of the suspended sheet. Otherwise, (e.g., if one or more of the conditions outlined above are not met) the print controller 120 does not reconstruct sheets and/or dispatch reconstructed sheets to the print engine 130.

EXAMPLES

In the following examples, additional processes, systems, and methods are described in the context of a print controller that reconstructs a suspended job from an intermediate page in an exemplary embodiment.

Figure 4:
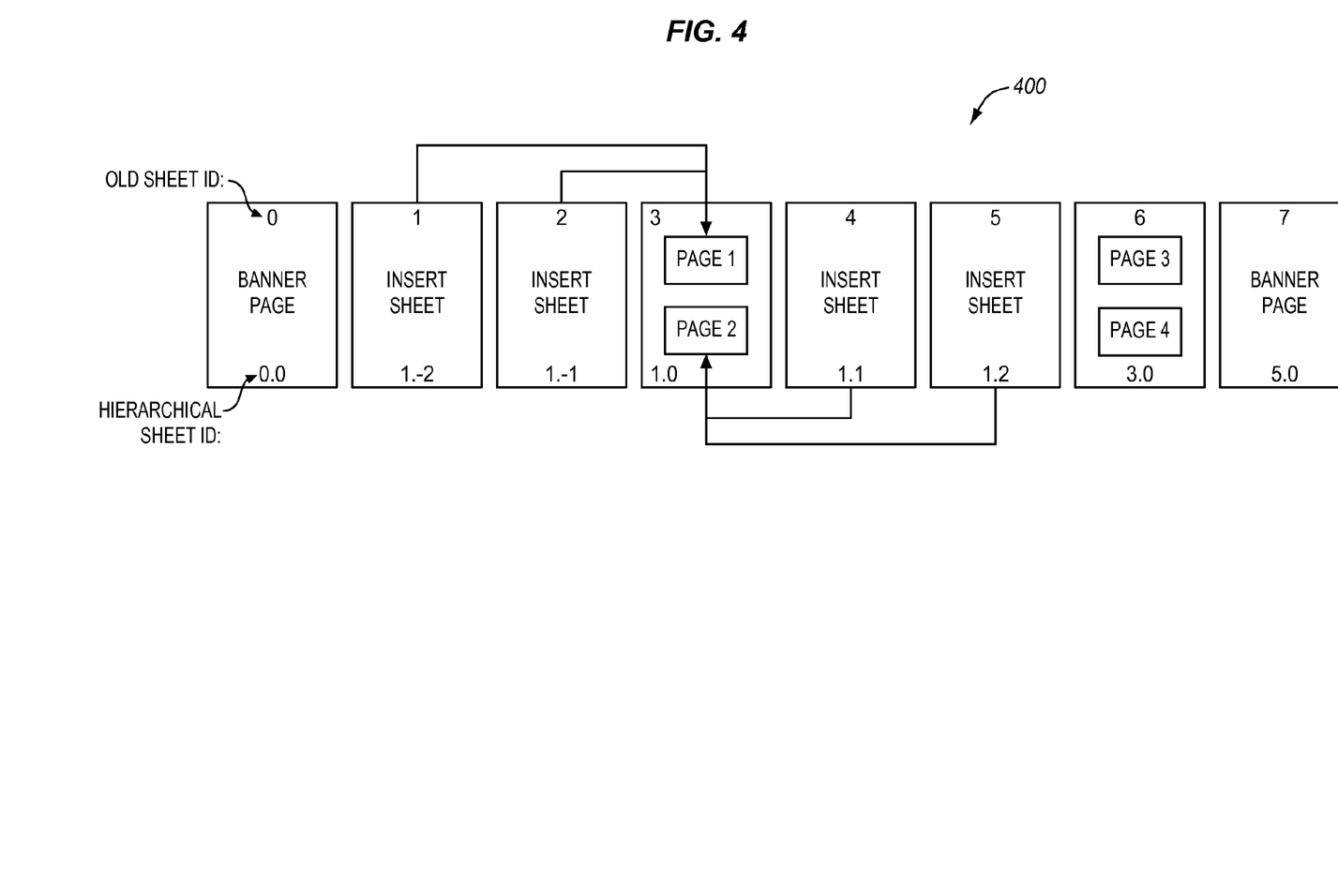
FIG. 4 illustrates a print job in an exemplary embodiment.

FIG. 4 illustrates a print job 400 in an exemplary embodiment. According to FIG. 4, print job 400 includes print data that comprises a plurality of logical pages, each logical page encoded according to a page description language. In this example, print job 400 is a simplex, 2-up job that includes four pages. Additionally, logical page 1 has two insert sheets attached before and logical page 2 has two insert sheets attached after. The print job 400 also includes banner pages at the beginning and end.

As shown in FIG. 4, previous sheet identifiers (shown at the top of each sheet) monotonically increase starting from zero. Sheet identifier modifier 122 modifies the old sheet identifiers into the sheet identifiers as shown (shown near the bottom of each sheet). The sheet identifiers are in the form "x.y" where x represents sheet number and y represents the offset.

For the first sheet, which is a banner page, the sheet identifier is 0.0. Banner pages are not typically associated with any data page. Thus, it is conceptualized that the banner page is associated with page 0 which is a non-existing page. The offset for the banner page is also set to 0 to distinguish it from similar sheets without an associated page, such as a front cover.

The next sheet is an insert sheet that was associated with logical page 1 because a user requested two insert sheets before logical page 1. Thus, its sheet number is 1 because logical page 1 is the minimum logical page number related to construction this insert sheet. Because this insert sheet is attached before logical page 1, it is assigned a negative offset to distinguish it from inserts sheets which are attached after logical pages. The page offset in this case is −2 because it is the earlier of the two insert sheets attached before logical page 1. Thus, the sheet identifier for this insert sheet is 1.-2. Similarly, the sheet identifier for the next sheet is 1.-1.

Next, the data sheet's sheet identifier is 1.0 because logical page 1 is the first page added to the data sheet and logical page 1 is used to construct this sheet. Because the sheet contains logical page 1 itself, the offset is 0. As mentioned, for the print job 400, a user requested two insert sheets after page 2. Although originally attached to page 2, the sheet identifier for these insert sheets includes a sheet number of 1 because logical page 1 is the minimum page number (or first logical page) used to construct the sheet that contains logical page 2. This way, in the event of building a suspended job at this point, the build starts with logical page 1 and the job model is in a valid state since logical page 1 is used to construct the sheet that contains logical page 2. Otherwise, without starting to build from logical page 1, the job model is in an invalid state. The offsets of these two insert sheets are 1 and 2, assigned in the order of their appearance (e.g., order to be printed).

The next data sheet has a sheet identifier set to 3.0 because logical page 3 is the first page added to the data sheet and logical page 3 is used to construct this sheet. Similarly, the offset is 0 because the sheet contains logical page 3 itself. Finally, the sheet identifier for the banner page at the end is 5.0. Because banner pages are not associated with any real source page it is conceptually associated with a non-existing page, which is a page past the last logical page in the job (e.g., in this example, 5 is one unit past the last logical page 4). The page offset is used to distinguish between sheets that appear at the end of a job but are not associated with any real page.

Though described with respect to printing system 100 of FIG. 1, those of ordinary skill in the art will appreciate that the operations of sheet identifier modifier 122 are applicable in other systems as well. Additionally, the particular format, order, orientation, and symbols described with respect to the sheet identifiers (e.g., sheet number and offset) may be implemented in a variety of ways by matter of design choice.

Figure 5:
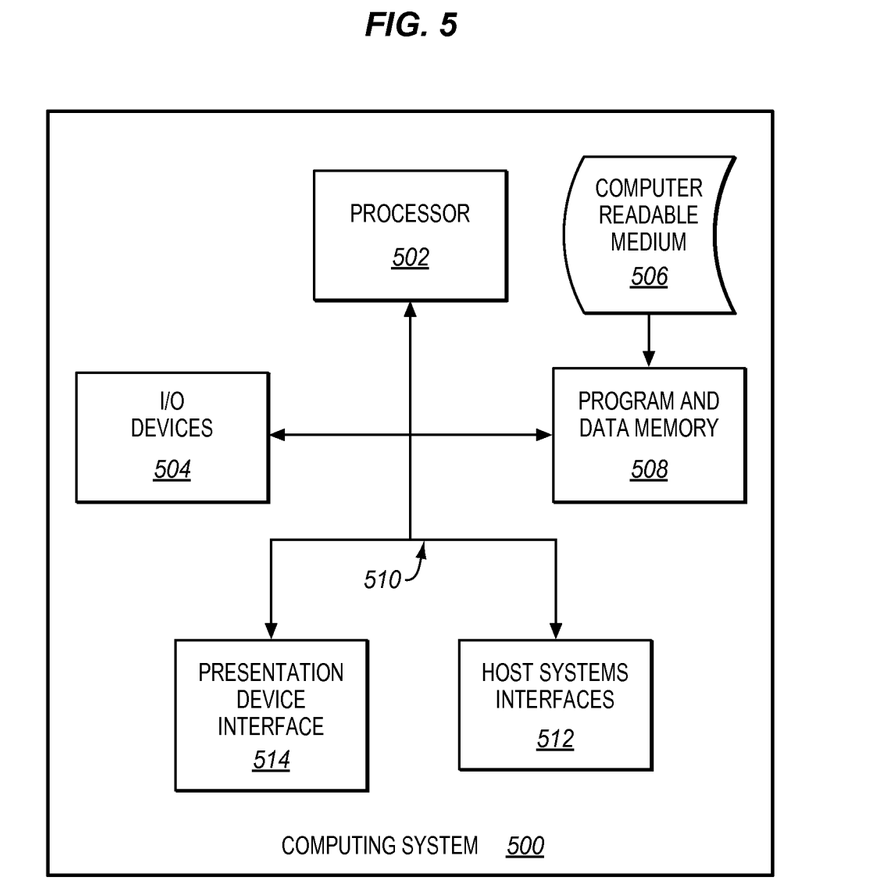
FIG. 5 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct processing system(s) of the print controller 120 to perform the various operations disclosed herein. FIG. 5 illustrates a computing system 500 configured to execute a computer readable medium embodying programmed instructions to perform desired functions in an exemplary embodiment. Computing system 500 is configured to perform the above operations by executing programmed instructions tangibly embodied on computer readable medium 506. In this regard, embodiments can take the form of a computer program accessible via computer readable medium 506 providing program code for use by a computer or any other instruction execution system. For the purposes of this description, computer readable storage medium 506 can be anything that can contain or store the program for use by the computer.

Computer readable storage medium 506 can be an electronic, magnetic, optical, electromagnetic, infrared, or semiconductor device. Examples of computer readable storage medium 506 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. Computing system 500, being suitable for storing and/or executing the program code, includes at least one processor 502 coupled to program and data memory 508 through a system bus 510. Program and data memory 508 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 504 (including but not limited to keyboards, displays, pointing devices, etc.) can be coupled either directly or through intervening I/O controllers. Host system interfaces 512 may also be integrated with the system to enable computing system 500 to become coupled to other data processing systems or storage devices through intervening private or public networks. Modems, cable modems, SCSI, Fibre Channel, and Ethernet cards are just a few of the currently available types of network or host interface adapters. Presentation device interface 514 may be integrated with the system to interface to one or more presentation devices, such as printing systems and displays for presentation of presentation data generated by processor 502. Although specific embodiments were described herein, the scope of the inventive concept(s) is not limited to those specific embodiments. The scope of the inventive concept(s) is defined by the following claims and any equivalents thereof.

We claim:

1. A system comprising:
a print controller configured to receive a print job with logical pages, and to assemble the logical pages onto sheets to be printed based on instructions associated with the print job;
the print controller configured to identify multiple logical pages which are to be assembled together onto a sheet, and to assign the multiple logical pages a same identifier, the same identifier being a page number of one of the multiple logical pages;
the print controller configured to determine from the instructions that at least one of the multiple logical pages is associated with an insert sheet having no page data, to assign the insert sheet the same identifier as the multiple logical pages, and to assign the insert sheet an offset from the same identifier that indicates a sheet positon of the insert sheet associated with the at least one of the multiple logical pages from the sheet;
the print controller configured to initiate processing for resuming the print job from a suspended state by identifying the sheet as a suspension point, assembling the multiple logical pages for the sheet according to the same identifier, and resubmitting the sheet and the insert sheet with the same identifier to a print engine in an order based on the offset.

2. The system of claim 1 wherein:
the print controller configured to assign the same identifier a lowest page number from among the multiple pages to be assembled together onto the sheet.

3. The system of claim 1 wherein:
the print controller configured to assign a negative integer as the offset to the insert sheet when the insert sheet is ordered before the sheet within the print job.

4. The system of claim 1 wherein:
the print controller configured to assign a positive integer as the offset to the insert sheet when the insert sheet is ordered after the sheet within the print job.

5. The system of claim 1 wherein:
the print controller configured to identify a banner page in the print job, and to assign the banner page a different sheet identifier unrelated to page numbers of logical pages of the print job.

6. The system of claim 1 wherein:
the print controller configured to, responsive to a determination to resume the print job from the suspended state, initiate reconstruction of sheets based on logical pages with page numbers that are greater than or equal to the same identifier.

7. The system of claim 6 wherein:
the print controller configured to dispatch the reconstructed sheets to the print engine when same identifiers corresponding to the reconstructed sheets are greater than an identifier of a suspended sheet.

8. The system of claim 7 wherein:
the print controller configured to dispatch the insert sheet when the offset of the insert sheet having the same identifier as the suspended sheet is a positive integer.

9. A method comprising:
receiving a print job with logical pages;
assembling the logical pages onto sheets to be printed based on instructions associated with the print job;
identifying multiple logical pages which are to be assembled together onto a sheet;
assigning the multiple logical pages a same identifier, the same identifier being a page number of one of the multiple logical pages;
determining from the instructions that at least one of the multiple logical pages is associated with an insert sheet having no page data;
assigning the insert sheet the same identifier as the multiple logical pages;

assigning the insert sheet an offset from the same identifier that indicates a sheet positon of the insert sheet associated with the at least one of the multiple logical pages from the sheet; and initiating processing for resuming the print job from a suspended state by identifying the sheet as a suspension point, assembling the multiple logical pages for the sheet according to the same identifier, and resubmitting the sheet and the insert sheet with the same identifier to a print engine in an order based on the offset.

10. The method of claim 9 further comprising:

assigning the same identifier a lowest page number from among the multiple pages to be assembled together onto the sheet.

11. The method of claim 9 further comprising:

assigning a positive integer as the offset to the insert sheet when the insert sheet is ordered after the sheet within the print job.

12. The method of claim 9 further comprising:

identifying a banner page in the print job; and assigning the banner page a different sheet identifier unrelated to page numbers of logical pages of the print job.

13. The method of claim 9 further comprising:

responsive to a determination to resume the print job from the suspended state, initiating reconstruction of sheets based on logical pages with page numbers that are greater than or equal to the same identifier.

14. A non-transitory computer readable medium embodying programmed instructions which, when executed by a processor, are operable to perform a method comprising:

receiving a print job with logical pages;

assembling the logical pages onto sheets to be printed based on instructions associated with the print job;

identifying multiple logical pages which are to be assembled together onto a sheet;

assigning the multiple logical pages a same identifier, the same identifier being a page number of one of the multiple logical pages;

determining from the instructions that at least one of the multiple logical pages is associated with an insert sheet having no page data;

assigning the insert sheet the same identifier as the multiple logical pages;

assigning the insert sheet an offset from the same identifier that indicates a sheet positon of the insert sheet associated with the at least one of the multiple logical pages from the sheet; and initiating processing for resuming the print job from a suspended state by identifying the sheet as a suspension point, assembling the multiple logical pages for the sheet according to the same identifier, and resubmitting the sheet and the insert sheet with the same identifier to a print engine in an order based on the offset.

15. The medium of claim 14 the method comprising:

assigning the same identifier a lowest page number from among the multiple pages to be assembled together onto the sheet.

16. The medium of claim 14 the method comprising:

assigning a positive integer as the offset to the insert sheet when the insert sheet is ordered after the sheet within the print job.

17. The medium of claim 14 the method comprising:

identifying a banner page in the print job; and assigning the banner page a different sheet identifier unrelated to page numbers of logical pages of the print job.

18. The medium of claim 14 the method comprising:

responsive to a determination to resume the print job from the suspended state, initiating reconstruction of sheets based on logical pages with page numbers that are greater than or equal to the same identifier.

19. The medium of claim 18 the method comprising:

dispatching the reconstructed sheets to the print engine when same identifiers corresponding to the reconstructed sheets are greater than an identifier of a suspended sheet.

20. The medium of claim 19 the method comprising:

dispatching the insert sheet when the offset of the insert sheet having the same identifier as the suspended sheet is a positive integer.

* * * * *